United States Patent
Irifune

(10) Patent No.: US 8,367,212 B2
(45) Date of Patent: Feb. 5, 2013

(54) ULTRAVIOLET-CURABLE SILICONE COMPOSITION

(75) Inventor: Shinji Irifune, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 831 days.

(21) Appl. No.: 12/015,811

(22) Filed: Jan. 17, 2008

(65) Prior Publication Data

US 2008/0176086 A1    Jul. 24, 2008

(30) Foreign Application Priority Data

Jan. 18, 2007 (JP) ................................. 2007-009555

(51) Int. Cl.
*C08G 59/68* (2006.01)
*B32B 9/04* (2006.01)

(52) U.S. Cl. ......................................... 428/447; 522/31

(58) Field of Classification Search .................. None
See application file for complete search history.

(56) References Cited

U.S. PATENT DOCUMENTS

| | | | |
|---|---|---|---|
| 4,313,988 A * | 2/1982 | Koshar et al. | 428/40.7 |
| 4,822,687 A * | 4/1989 | Kessel et al. | 428/447 |
| 5,360,833 A * | 11/1994 | Eckberg et al. | 522/31 |
| 6,875,795 B2 * | 4/2005 | Irifune | 522/31 |
| 2003/0232900 A1 | 12/2003 | Irifune | |

FOREIGN PATENT DOCUMENTS

| | | |
|---|---|---|
| DE | 196 15 489 A1 | 10/1996 |
| EP | 0 391 162 A2 | 10/1990 |
| GB | 2 123 842 A | 2/1984 |
| JP | 2004-68000 | 3/2004 |

* cited by examiner

*Primary Examiner* — Callie Shosho
*Assistant Examiner* — Kenneth Stachel
(74) *Attorney, Agent, or Firm* — Oblon, Spivak, McClelland, Maier & Neustadt, L.L.P.

(57) ABSTRACT

Provided is an ultraviolet-curable silicone composition including: (A) a non-terminal epoxy group-containing organopolysiloxane, (B) an organopolysiloxane containing epoxy groups at the two terminals of the molecular chain, and an onium salt photoinitiator capable of generating cations upon irradiation with ultraviolet light. The silicone composition of the present invention yields a cured film that exhibits excellent ultraviolet-curability and can be readily peeled from a pressure-sensitively adhesive material. In particular, the silicone composition yields a cured film that exhibits a tight release force relative to pressure-sensitive adhesives such as acrylic-based pressure-sensitive adhesives, and also exhibits minimal fluctuation in the release force.

35 Claims, No Drawings

ULTRAVIOLET-CURABLE SILICONE COMPOSITION

BACKGROUND OF THE INVENTION

1. Field of the Invention

The present invention relates to an ultraviolet-curable release agent composition, which due to the releasability of the cured film thereof, can be used as a treatment agent for the back surface of a pressure-sensitive adhesive tape, or as a coating material for a release sheet, such as a release paper, a release plastic film, or a release metal foil, for use with pressure-sensitive adhesive labels.

2. Description of the Prior Art

A variety of ultraviolet-curable silicone compositions have been proposed. In recent years, a multitude of curing methods have been proposed in which an epoxy group-containing silicone is cured using an onium salt photoinitiator as a catalyst (see patent references 1 to 3). This type of curing method is less susceptible to curing inhibition caused by oxygen than curing methods that utilize a radical reaction, and because the curing reaction proceeds favorably in air, these compositions are now being used as treatment agents for the back surface of pressure-sensitive adhesive tapes, and as coating materials for release sheets, such as release papers, release plastic films, or release metal foils, for use with pressure-sensitive adhesive labels.

For example, a packaging tape comprises a substrate tape and a pressure-sensitive adhesive coated on one side of the substrate tape, and further comprises a release coating on the opposite side of the substrate tape. The packaging tape is wound before use into a roll such that the pressure-sensitive adhesive coating comes into contact with the release coating. The packaging tape is unwound for use by peeling the pressure-sensitive adhesive layer side thereof off the release coating side. A minimum force required to peel the release coating from the pressure-sensitive adhesive layer is referred to as "release force".

Furthermore, packaging tapes are widely used in automatic taping operations, and these automatic taping machines are designed to operate with tapes of uniform release force. If the value of this release force is small, then the fluctuation in the release force at the time of release is minimal, but if the release force is large, then the fluctuation in the release force tends to increase. If this fluctuation in the release force is too great, then the automatic taping machine, which has been designed on the premise of a uniform release force, may be unable to function normally. Furthermore, if this fluctuation in the release force is too great, then peeling noises tend to occur. Reducing such peeling noises is usually desirable in terms of maintaining a favorable working environment.

For the reasons outlined above, a release agent that exhibits a tight release force with minimal fluctuation in the release force upon peeling has been greatly sought.

[Patent Reference 1] GB 2 123 842 A
[Patent Reference 2] EP 0 391 162 A2
[Patent Reference 3] US 2003/0232900 A1

SUMMARY OF THE INVENTION

For the reasons outlined above, the development of a silicone composition that yields a cured film that exhibits excellent ultraviolet-curability and can be readily peeled from a pressure-sensitively adhesive material, in particular, the development of a silicone composition that yields a cured film that exhibits a tight release force relative to pressure-sensitive adhesives such as acrylic-based pressure-sensitive adhesives (namely, a relatively large release force necessary for the cured film to be peeled from the pressure-sensitive adhesives), and also exhibits minimal fluctuation in the release force, has been keenly sought.

The present invention relates to an ultraviolet-curable silicone composition, which as described below, comprises a non-terminal epoxy group-containing organopolysiloxane (A) and a terminal epoxy group-containing organopolysiloxane containing epoxy groups at the both terminals (B) in a fixed blend ratio, and may also comprise a fixed blend quantity of a mixture of an organopolysiloxane (C) containing Q units (namely, tetrafunctional siloxane units represented by $SiO_{4/2}$) and an epoxy group-containing organopolysiloxane (D).

In other words, as a result of intensive investigation aimed at developing the type of composition described above, the inventors of the present invention discovered that the problems outlined above could be addressed by using the compositions described below, and they were therefore able to complete the present invention.

Namely, the present invention provides an ultraviolet-curable silicone composition comprising:

(A) 100 parts by mass of an epoxy group-containing organopolysiloxane represented by a formula (1) shown below:

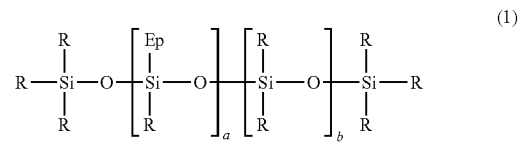

(1)

(wherein, R represents an unsubstituted or substituted monovalent hydrocarbon group of 1 to 10 carbon atoms, Ep represents an epoxy group-containing substituent group, a and b represent integers that satisfy $45 \leq a+b \leq 150$, $1 \leq a$ and $0 \leq b$, and an average epoxy equivalence is not more than 700 g/mol), (B) 1 to 15 parts by mass of a terminal epoxy group-containing organopolysiloxane represented by a formula (2) shown below:

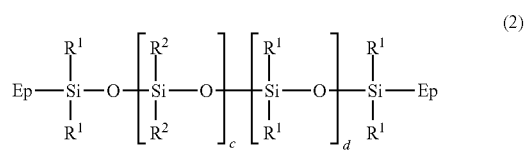

(2)

(wherein, $R^1$ represents an unsubstituted or substituted monovalent hydrocarbon group of 1 to 10 carbon atoms other than an aryl group, Ep represents an epoxy group-containing substituent group, $R^2$ represents an aryl group, and c and d represent positive integers that satisfy $45 \leq c+d \leq 350$ and $0.05 \leq c/(2+c+d) \leq 0.30$, and an onium salt photoinitiator.

The present invention also provides, as a preferred embodiment of the composition stated above, a composition comprising the above components (A) and (B), and further comprising the components (C) and (D) described below in a predetermined blend quantity, as a mixture of the two components in which the mixing ratio (mass ratio) satisfies (C)/(D)=0.1 to 1.5.

(C) an organopolysiloxane represented by a formula (3) shown below:

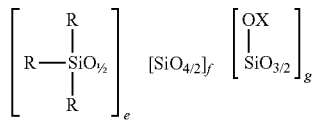
(3)

[wherein, R represents an unsubstituted or substituted monovalent hydrocarbon group of 1 to 10 carbon atoms, each X represents, independently, a hydrogen atom or a substituent group selected from the group consisting of substituent groups represented by the general formulas (i)-(iii) shown below, and e, f and g are positive numbers such that e/(f+g) is within a range from 0.5 to 2.0:

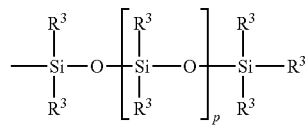
(i)

(wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, and p represents an integer of 0 or greater)

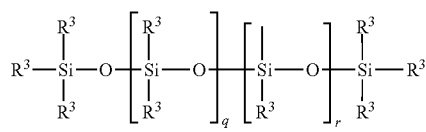
(ii)

(wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, q represents an integer of 0 or greater, and r represents an integer of 1 or greater)

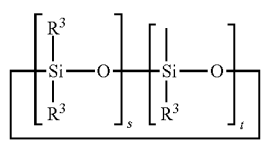
(iii)

(wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, s represents an integer of 2 or greater, and t represents an integer of 1 or greater)].

(D) at least one member selected from the group consisting of epoxy group-containing organopolysiloxanes represented by a formula (4) shown below and epoxy group-containing organopolysiloxanes represented by a formula (5) shown below:

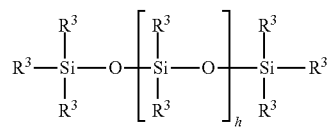
(4)

(wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and h represents an integer of 3 or greater)

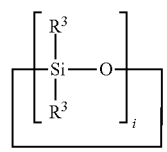
(5)

(wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and i each represent an integer of 3 or greater).

In other words, as a result of varied investigations aimed at developing a silicone composition that cures readily upon irradiation with ultraviolet light, and yields a cured film that exhibits a tight release force with minimal fluctuation in the release force, the inventors of the present invention discovered that this objective can be achieved by adding an onium salt photoinitiator as a catalyst to a composition prepared by blending an organopolysiloxane containing epoxy groups only as non-terminal side chains (i.e., as substituent groups bonded to non-terminal silicon atoms within the molecular chain) and with an epoxy equivalence of not more than 700 mol/g, with a predetermined blend quantity of an organopolysitoxane containing at least 5 mol % of diarylsiloxane units within the molecule and containing epoxy groups only at the both molecular chain terminals. The resulting composition was then applied to a substrate and cured by irradiation with ultraviolet light, the resulting cured film exhibited excellent releasability from pressure-sensitively adhesive materials, and also exhibited a tight release force with minimal fluctuation in the release force upon peeling. Thus, the inventors were able to complete the present invention.

The present invention also provides a cured product obtained by curing the above composition.

The present invention further provides a release sheet comprising: a substrate, and a cured product layer obtained by curing a layer of the above composition provided on one side or both sides of the substrate.

Moreover, the present invention provides a method of producing a release sheet comprising: a substrate, and a cured product layer obtained by curing a layer of the above composition provided on one side or both sides of the substrate, the method comprising the steps of:

applying the composition to one side or both sides of the substrate, and curing a layer of the composition thus obtained by irradiation with ultraviolet light to form the cured product.

The release force varies considerably depending on the pressure-sensitive adhesive used, even if a release sheet, such as a release paper, a release plastic film, or a release metal foil, with the same silicone composition is used. However, in the description of the present invention, in those cases where an acrylic pressure-sensitive adhesive tape is used, such as the Tesa-7475 tape used in the examples, "tight release force" is defined as being 1.0 N/25 mm or greater.

A composition of the present invention uses an onium salt photoinitiator as a catalyst, and cures readily upon irradiation with ultraviolet light to form a cured film that bonds favorably to substrates such as plastics, can be peeled off pressure-sensitively adhesive materials, and exhibits a tight release force with minimal fluctuation in the release force upon peeling.

DETAILED DESCRIPTION OF THE PREFERRED EMBODIMENTS

A more detailed description of the composition of the present invention is provided below.

[Component (A)]

An organopolysiloxane of the component (A) of an ultraviolet-curable silicone composition of the present invention is a straight-chain diorganopolysiloxane having epoxy group-containing substituents only as substituent groups bonded to the silicon atoms of non-terminal siloxane units within the molecular chain (namely, only as pendant groups), as represented by a formula (1) shown below.

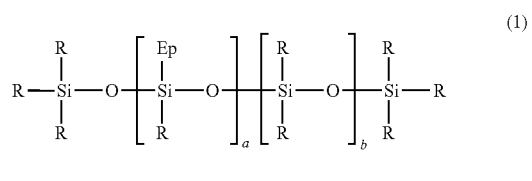

(1)

In the formula (1), R represents a group selected from unsubstituted and substituted monovalent hydrocarbon groups of 1 to 10 carbon atoms, and specific examples include alkyl groups such as a methyl group, ethyl group, propyl group or butyl group, cycloalkyl groups such as a cyclohexyl group, aryl groups such as a phenyl group or tolyl group, and groups in which a portion of, or all of, the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. In terms of achieving favorable releasability for the cured product of the epoxy group-containing organopolysiloxane of the present invention, an alkyl group or aryl group is preferred.

Ep represents an epoxy group-containing substituent group, and specific examples include the groups shown below.

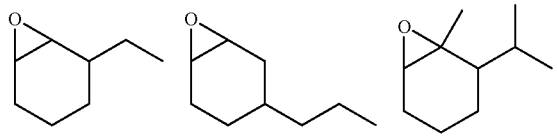

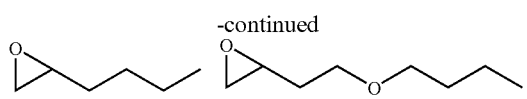

$a$ and $b$ are integers that satisfy $1 \leq a$ and $0 \leq b$, and are preferably positive integers. The average polymerization degree of the component (A) is preferably such that $45 \leq a+b \leq 150$, and preferably $45 \leq a+b \leq 100$. If $a+b$ is less than 45, then the viscosity is too low, whereas if $a+b$ exceeds 150, then the viscosity becomes too high, causing a deterioration in the coating properties. Furthermore, the average epoxy equivalence must be not more than 700 g/mol, and is preferably not more than 650 g/mol. Specifically, $a$ and $b$ preferably satisfy $0.1 \leq a/a+b \leq 0.3$, and even more preferably satisfy $0.1 \leq a/a+b \leq 0.2$. If the epoxy equivalence is higher than 700 g/mol (namely, the epoxy group content is lower), then the resulting cured film does not exhibit a tight release force, and the adhesion to plastic film substrates deteriorates. The component (A) may be either a single straight-chain diorganopolysiloxane containing epoxy groups only at non-terminal positions within the molecular chain, as represented by the above formula (1), or a mixture of two or more of these straight-chain diorganopolysiloxanes.

[Component (B)]

A terminal epoxy group-containing organopolysiloxane of the component (B) is a straight-chain diorganopolysiloxane containing epoxy group-containing substituents only as substituent groups bonded to the silicon atoms at the both molecular chain terminals, and also containing a diarylsiloxane unit as an essential unit, as represented by an average composition formula (2) shown below.

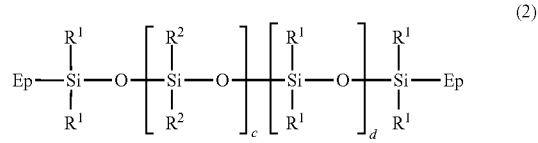

(2)

In the formula (2), $R^1$ represents an unsubstituted or substituted monovalent hydrocarbon group of 1 to 10 carbon atoms other than an aryl group, and specific examples include alkyl groups such as a methyl group, ethyl group, propyl group or butyl group, cycloalkyl groups such as a cyclohexyl group, and groups in which a portion of, or all of, the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. Of these, a methyl group is preferred.

Ep represents an epoxy group-containing substituent group, and specific examples include the groups shown below.

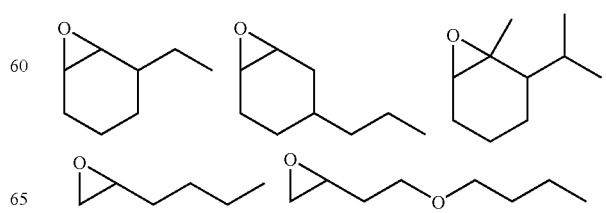

$R^2$ represents an aryl group such as a phenyl group or tolyl group. Furthermore, c and d are positive integers, and the average polymerization degree of the component (B) is preferably such that $45 \leq c+d \leq 350$, and preferably $45 \leq c+d \leq 100$. If c+d is less than 45, then the fluctuation in the release force tends to increase, whereas if c+d exceeds 350, then the viscosity becomes too high, causing a deterioration in the coating properties of the composition.

The value of c, which represents the quantity of diarylsiloxane units within each molecule, must satisfy $0.05 \leq c/(2+c+d) \leq 0.30$, and preferably satisfies $0.05 \leq c/(2+c+d) \leq 0.20$. If the value of $c/(2+c+d)$ is less than 0.05, then the fluctuation in the release force tends to increase, whereas if $c/(2+c+d)$ exceeds 0.30, then the viscosity becomes too high, causing a deterioration in the coating properties. The component (B) may be either a single straight-chain diorganopolysiloxane containing epoxy groups only at the both molecular chain terminals, as represented by the above formula (2), or a mixture of two or more of these straight-chain diorganopolysiloxanes.

The quantity added of the component (B) is typically within a range from 1 to 15 parts by mass, preferably from 1 to 10 parts by mass, and more preferably from 1 to 5 parts by mass, per 100 parts by mass of the component (A). If this quantity is less than 1 part by mass, then the fluctuation in the release force tends to increase. In contrast, if the quantity exceeds 15 parts by mass, then a cured film produced from the obtained composition may not exhibit a tight release force.

[Component (C)]

The Q unit-containing organopolysiloxane of the component (C) is a three dimensional network structure organopolysiloxane represented by an average composition formula (3) shown below.

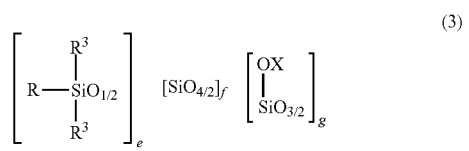

(3)

In the formula (3), R represents an unsubstituted or substituted monovalent hydrocarbon group of 1 to 10 carbon atoms, and specific examples include alkyl groups such as a methyl group, ethyl group, propyl group or butyl group, cycloalkyl groups such as a cyclohexyl group, aryl groups such as a phenyl group or tolyl group, and groups in which a portion of, or all of, the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. In terms of achieving favorable releasability for the cured product of the composition of the present invention, R is preferably an alkyl group or aryl group, and is most preferably an alkyl group.

Each X represents, independently, a hydrogen atom or a substituent group selected from the group consisting of substituent groups represented by the general formulas (i)-(iii) shown below, and at least one of the X groups is preferably an epoxy group-containing substituent group selected from the group consisting of substituent groups represented by the general formulas shown below.

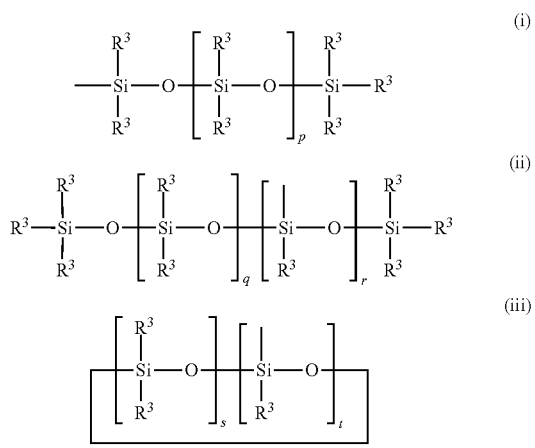

In each of the formulas (i) to (iii), each $R^3$ represents, independently, an unsubstituted or substituted monovalent hydrocarbon group of 1 to 10 carbon atoms, or an epoxy group-containing substituent group, provided that at least one $R^3$ group represents an epoxy group-containing substituent group. Specific examples of unsubstituted or substituted monovalent hydrocarbon groups of $R^3$ include alkyl groups such as a methyl group, ethyl group, propyl group or butyl group, cycloalkyl groups such as a cyclohexyl group, aryl groups such as a phenyl group or tolyl group, and groups in which a portion of, or all of, the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. Each $R^3$ group may be different.

Specific examples of epoxy group-containing substituent groups of $R^3$ include the groups shown below.

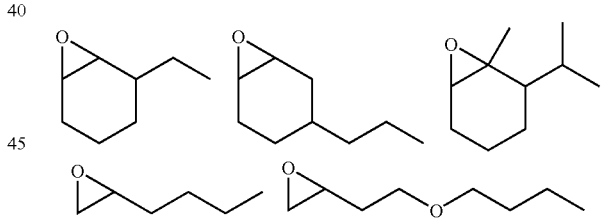

Furthermore, s represents an integer of 2 or greater, r and t each represent an integer of 1 or greater, and p and q each represent an integer of 0 or greater. Moreover, e, f and g are positive numbers such that $e/(f+g)$ is within a range from 0.5 to 2.0, and is preferably within a range from 0.6 to 1.3. The component (C) may be either a single epoxy group-containing organopolysiloxane represented by the above average composition formula (3), or a mixture of two or more of these organopolysiloxanes.

[Component (D)]

The epoxy group-containing organopolysiloxane of the component (D) is a straight chain-structure organopolysiloxane represented by the formula (4) shown below and/or a cyclic-structure organopolysiloxane represented by the formula (5) shown below. In the epoxy group-containing straight-chain organopolysiloxane represented by the formula (4), the positions of the epoxy group-containing substituent groups bonded to silicon atoms within the molecule are random. The fact that these bonding positions can not be specified as being solely at the silicon atoms at the molecular chain terminals, or solely at non-terminal silicon atoms within the molecular chain clearly distinguishes this component structurally from the above components (A) and (B).

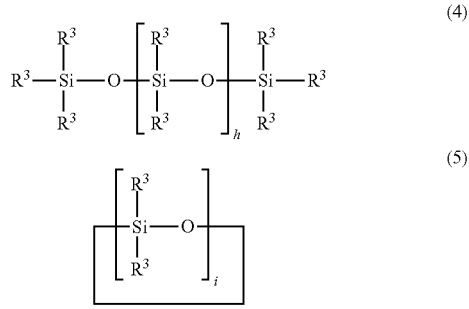

In each of the formulas (4) and (5), each $R^3$ represents, independently, an unsubstituted or substituted monovalent hydrocarbon group of 1 to 10 carbon atoms, or an epoxy group-containing substituent group, provided that at least two $R^3$ groups represent epoxy group-containing substituent groups. Specific examples of unsubstituted or substituted monovalent hydrocarbon groups of $R^3$ include alkyl groups such as a methyl group, ethyl group, propyl group or butyl group, cycloalkyl groups such as a cyclohexyl group, aryl groups such as a phenyl group or tolyl group, and groups in which a portion of, or all of, the hydrogen atoms bonded to carbon atoms within one of the above groups have been substituted with a hydroxyl group, cyano group or halogen atom or the like, such as a hydroxypropyl group, cyanoethyl group, 1-chloropropyl group or 3,3,3-trifluoropropyl group. Each $R^3$ group may be different.

Specific examples of epoxy group-containing substituent groups of $R^3$ include the groups shown below.

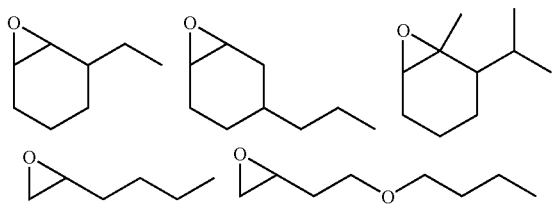

Furthermore, h and i each represent an integer of 3 or greater, provided that the viscosity at 25° C. for the epoxy group-containing organopolysiloxane represented by the formulas (4) or (5) is within a range from 1 to 50,000 mPa·s, and preferably from 10 to 10,000 mPa·s. The straight-chain organopolysiloxane represented by the above formula (4), or the cyclic organopolysiloxane represented by the above formula (5) used as the component (D) may be a single polymer or a mixture of two or more of polymers.

The quantity added of a mixture of the components (C) and (D) is preferably within a range from 1 to 10 parts by mass, more preferably from 2 to 5 parts by mass per 100 parts by mass of the component (A). The mixing ratio (mass ratio) within the mixture satisfies preferably (C)/(D)=0.1 to 1.5, more preferably 0.2 to 1.0. If the quantity and the mixing ratio are within these ranges, then a cured film that exhibits a tight release force with minimal fluctuation in the release force can be more readily obtained.

[Onium Salt Photoinitiator]

An onium salt photoinitiator that is capable of generating cations upon irradiation with ultraviolet light is suitable as the photoinitiator used for curing the silicone composition of the present invention. Examples of this photoinitiator include diaryliodonium salts, triarylsulfonium salts, triarylselenonium salts, tetraarylphosphonium salts and aryldiazonium salts, represented by the formulas $R^4{}_2I^+Y^-$, $R^4{}_3S^+Y^-$, $R^4{}_3Se^+Y^-$, $R^4{}_4P^+Y^-$ and $R^4N^+Y^-$ respectively (wherein, $R^4$ represents an aryl group, and $Y^-$ represents an anion such as $SbF_6{}^-$, $AsF_6{}^-$, $PF_6{}^-$, $BF_4{}^-$, $HSO_4{}^-$ and $ClO_4{}^-$). In terms of curing reactivity, diaryliodonium and triarylsulfonium hexafluoroantimonates are preferred. The quantity added of the onium salt is typically within a range from 0.1 to 20 parts by mass per 100 parts by mass of the composition. If the quantity is less than this range, then the curability is inadequate, whereas a quantity larger than this range tends to have an adverse effect on the surface state of the cured film, causing a deterioration in the releasability.

The silicone composition of the present invention may also include other components if required, including epoxy-based diluents, vinyl ether-based diluents, adhesion improvers for improving the adhesion to substrates, leveling agents, antistatic agents, defoaming agents, pigments, and other organopolysiloxanes. The composition may also be diluted with an organic solvent.

Furthermore, in order to regulate the release force, the composition of the present invention may also be used in combination with other epoxy group-containing organopolysiloxanes.

Because the composition of the present invention can be cured readily by a short period of irradiation with ultraviolet light, the composition can be used as a release agent for release sheets, such as release papers, release plastic films, and release metal foils, as a treatment agent for the back surface of pressure-sensitive adhesive tapes, or as a protective coating material for metals or plastics.

Examples of substrates that can be used with the composition of the present invention include paper substrates such as glassine paper, kraft paper and clay-coated paper, laminated papers such as polyethylene-laminated high-quality paper and polyethylene-laminated kraft paper, plastic films formed of synthetic resins such as polyester, polypropylene, polyethylene, polyvinyl chloride, polytetrafluoroethylene and polyimide, and metal foils of metals such as aluminum.

Application of the composition of the present invention to a substrate can be conducted using a conventional method such as roller coating, gravure coating, wire-doctor coating, air-knife coating or dip coating. The coating quantity is typically within a range from 0.01 to 100 g/m², and the applied film can be readily cured by irradiation with ultraviolet light. Examples of the ultraviolet light source include a high-pressure mercury lamp, medium-pressure mercury lamp, low-pressure mercury lamp, metal halide lamp, or mercury arc lamp. When a high-pressure mercury lamp (80 W/cm) is used as the light source, the applied film can be cured by irradiation for 0.01 to 10 seconds from a distance of 5 to 20 cm.

EXAMPLES

The present invention is described in more detail below using a series of examples and comparative examples, although the present invention is in no way limited by these examples. In the examples, the units "parts" refer to "parts by mass", and Me and Ph represent a methyl group and a phenyl group, respectively. The values for the physical properties reported in the examples refer to measured values obtained using the test methods described below.

[Release Force]

The silicone composition was applied to an OPP film (i.e., bi-oriented polypropylene film) with a coating quantity of approximately 0.8 g/m², and a cured film was then formed on the OPP film by irradiating the applied coating with ultraviolet light from two 80 W/cm high-pressure mercury lamps that generated an exposure dose of 70 mJ/cm². A Tesa-7475 tape (tradename; an acrylic-based pressure-sensitive adhesive manufactured by Tesa Tape, Inc.) with a width of 2.5 cm was bonded to the surface of the cured film, and compression was then applied by rolling a 2 kg roller back and forth across the surface, and the OPP film with the cured film of the laminate thus obtained was cut such that the width thereof was adjusted to that of the Tesa-7475 tape, thereby preparing a strip sample with a width of 2.5 cm for measuring the release force.

The sample was aged for 20 to 24 hours at room temperature with a load of 70 g/cm² being applied to the sample. Subsequently, at one end of the strip sample, the Tesa-7475 tape and the OPP film were manually peeled off each other slightly, and then the respective peeled ends thereof were pulled by means of a tensile tester away from each other at an angle of 180° and at a peel speed of 0.3 m/minute. The force (g/2.5 cm) required to peel the tape off the cured film on the OPP film was measured. A release force was calculated as the average value of the maximum value and the minimum value within the obtained chart.

[Fluctuation in Release Force]

The fluctuation in the release force was calculated by dividing the difference between the maximum and minimum values for the release force in the above measurement by the release force obtained from the above measurement, and then expressing the ratio as a percentage. Larger values indicate a larger fluctuation in the release force. Compositions for which this fluctuation in release force exceeds 30% are considered to exhibit too large a fluctuation in the release force, and are unsuitable for automatic taping operations.

Example 1

An epoxy group-containing polysiloxane 1 corresponding with the component (A), with an epoxy equivalence of 620 g/mol and a viscosity of 280 mPa·s, and represented by a formula A-1 shown below (100 parts), and

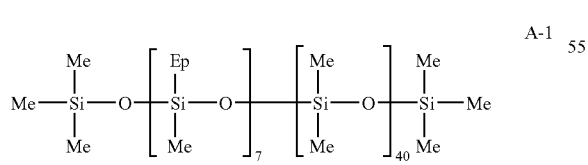

A terminal epoxy group-containing polysiloxane 2 corresponding with the component (B), having epoxy groups only at the two terminals, and having an epoxy equivalence of 4,300 g/mol and a viscosity of 350 mPa·s, as represented by a formula B-1 shown below (1 part)

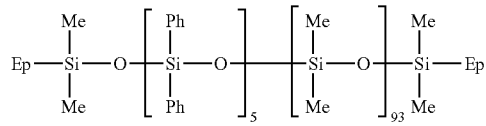

(wherein, Ep represents the formula shown below)

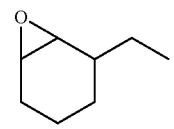

were mixed together thoroughly in advance, and an iodonium salt photoinitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in Table 1.

Example 2

The above epoxy group-containing polysiloxane 1 (100 parts) and the terminal epoxy group-containing polysiloxane 2 (10 parts) were mixed together thoroughly in advance, and an iodonium salt photoiriitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in Table 1.

Example 3

Method of Synthesizing Polysiloxane 3

A four-necked flask fitted with a stirrer, a thermometer, a reflux condenser, and a dropping funnel was charged with a 60% by mass toluene solution 1 of an OH group-containing organopolysiloxane consisting of $Me_3SiO_{1/2}$/units, $SiO_{4/2}$ units and $(HO)SiO_{3/2}$ units (the molar ratio: ($[Me_3SiO_{1/2}$ units]/[the combined total of $SiO_{4/2}$ units+$(HO)SiO_{3/2}$ units])=0.70, and the —OH group content was 0.85% by mass) (490 parts), and an organohydrogenpolysiloxane represented by an average composition formula shown below (345 parts).

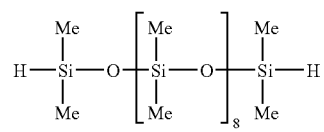

A 0.5% by mass toluene solution of a platinum catalyst (1.2 parts) was then added, and the mixture was refluxed for 3 hours at 132° C. After completion of the dehydrogenation condensation reaction, the reaction mixture was cooled to 30° C. Meanwhile, a separate four-necked flask fitted with a stirrer, a thermometer, a reflux condenser, and a dropping funnel was charged with 4-vinylcyclohexene oxide (142 parts) and a 0.5% by mass toluene solution of a platinum catalyst (0.65 parts), and the mixture was heated to 70° C. The entire quantity of the dehydrogenation condensation reaction product was then added dropwise to this flask over two hours. Following completion of the dropwise addition, the resulting mixture was stirred at 70° C. for a further one hour. The toluene and volatile components were removed by distillation at 80° C. and 3 Torr, yielding a sample 1 (680 parts). The sample 1 was a brown colored, transparent liquid with a viscosity of 350 mPa·s and an epoxy equivalence of 800 g/mol. Analysis by NMR and GPC revealed that the sample 1 was a mixture of a Q unit-containing, epoxy group-containing organopolysiloxane that corresponded with the component (C), and a straight-chain and/or cyclic epoxy group-containing organopolysiloxane that corresponded with the component (D), in which the mass ratio of (C)/(D) was approximately 0.7. This mixture (the sample 1) was termed the polysiloxane 3.

The above epoxy group-containing polysiloxane 1 (100 parts), the terminal epoxy group-containing polysiloxane 2 (1 part), and the polysiloxane 3 that corresponds with a mixture of the components (C) and (D) (1 part) were mixed together thoroughly in advance, and an iodonium salt photoinitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in Table 1.

Example 4

The above epoxy group-containing polysiloxane 1 (100 parts), the terminal epoxy group-containing polysiloxane 2 (1 part), and the above polysiloxane 3 (10 parts) were mixed together thoroughly in advance, and an iodonium salt photoinitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in the table.

Comparative Example 1

The above epoxy group-containing polysiloxane 1 (100 parts), was mixed with an iodonium salt photoinitiator CAT-7605 (1 part) manufactured by Shin-Etsu Chemical Co., Ltd., thereby yielding a treatment agent. The release force and the fluctuation in the release force for a cured film of this treatment agent were measured in accordance with the evaluation methods described above. The results are shown below in Table 1.

Comparative Example 2

The above epoxy group-containing polysiloxane 1 (100 parts) and the above polysiloxane 3 (10 parts) were mixed together thoroughly in advance, and an iodonium salt photoinitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in Table 1.

Comparative Example 3

The above epoxy group-containing polysiloxane 1 (100 parts) and the terminal epoxy group-containing polysiloxane 2 (20 parts) were mixed together thoroughly in advance, and an iodonium salt photoinitiator CAT-7605 (1 part) manufactured by Shin-Etsu Chemical Co., Ltd. was then added and mixed, thereby yielding a treatment agent. The release force and the fluctuation in the release force for a cured film of this treatment agent were measured in accordance with the evaluation methods described above. The results are shown below in Table 1.

TABLE 1

| | Silicone composition | | | | |
|---|---|---|---|---|---|
| | Polysiloxane (A) Blend quantity (parts) | Polysiloxane (B) Blend quantity (parts) | Mixture of (C) and (D) Ratio of (C)/(D): approximately 0.7 Blend quantity (parts) | Release force (N/2.5 cm) | Fluctuation in release force (%) |
| Example 1 | 100 | 1 | 0 | 1.10 | 5 |
| Example 2 | 100 | 10 | 0 | 1.05 | 2 |
| Example 3 | 100 | 1 | 1 | 1.35 | 5 |
| Example 4 | 100 | 1 | 10 | 1.90 | 2 |
| Comparative example 1 | 100 | 0 | 0 | 1.35 | 68 |
| Comparative example 2 | 100 | 0 | 10 | 2.50 | 75 |
| Comparative example 3 | 100 | 20 | 0 | 0.55 | 1 |

What is claimed is:

1. An ultraviolet-curable silicone composition comprising:
(A) 100 parts by mass of an epoxy group-containing organopolysiloxane represented by a formula (1) shown below:

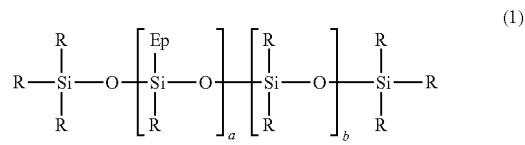

wherein, R represents a methyl group, Ep represents an epoxy group-containing cyclohexyl group, a and b represent integers that satisfy $45 \leq a+b \leq 150$, $1 \leq a$ and $0 \leq b$, and an average epoxy equivalence is not more than 700 g/mol, (B) 1 to 15 parts by mass of a terminal epoxy group-containing organopolysiloxane represented by a formula (2) shown below:

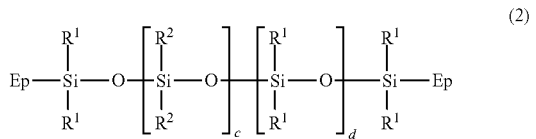
(2)

wherein, $R^1$ represents a methyl group, Ep represents an epoxy group-containing cyclohexyl group, $R^2$ represents a phenyl group, and c and d represent positive integers that satisfy $45 \leq c+d \leq 350$ and $0.05 \leq c/(2+c+d) \leq 0.20$, and
an onium salt photoinitiator.

2. The composition according to claim 1, further comprising from 1 to 10 parts by mass of a mixture of a component (C) and a component (D) described below, in which a mixing ratio in a mass basis within the mixture satisfies (C)/(D)=0.1 to 1.5:

(C) an organopolysiloxane represented by a formula (3) shown below:

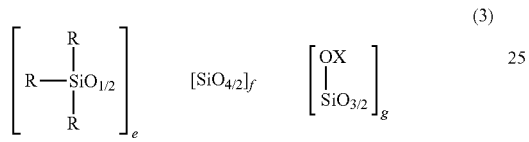
(3)

wherein, R represents an unsubstituted or substituted monovalent hydrocarbon group of 1 to 10 carbon atoms, each X represents, independently, a hydrogen atom or a substituent group selected from the group consisting of substituent groups represented by general formulas (i)-(iii) shown below, and e, f and g are positive numbers such that e/(f+g) is within a range from 0.5 to 2.0:

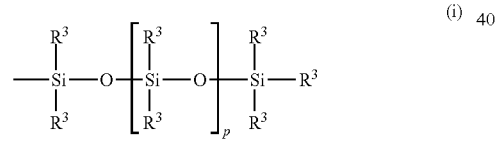
(i)

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, and p represents an integer of 0 or greater

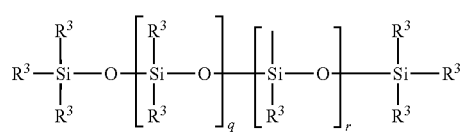
(ii)

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, q represents an integer of 0 or greater, and r represents an integer of 1 or greater

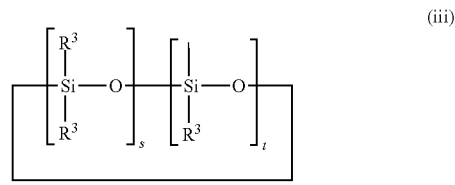
(iii)

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, s represents an integer of 2 or greater, and t represents an integer of 1 or greater, (D) at least one member selected from the group consisting of epoxy group-containing organopolysiloxanes represented by a formula (4) shown below and epoxy group-containing organopolysiloxanes represented by a formula (5) shown below:

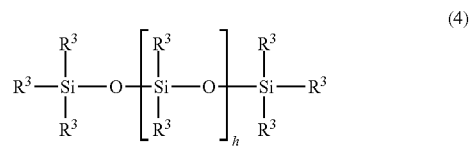
(4)

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and h represents an integer of 3 or greater

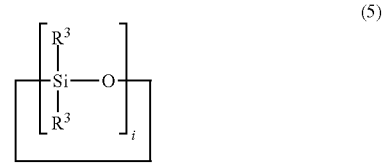
(5)

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and i represents an integer of 3 or greater.

3. A cured product obtained by curing the composition according to claim 2.

4. A release sheet comprising: a substrate, and a cured product layer obtained by curing a layer of the composition according to claim 2 provided on one side or both sides of the substrate.

5. A method of producing a release sheet comprising: a substrate, and a cured product layer obtained by curing a layer of the composition according to claim 2 provided on one side or both sides of the substrate, the method comprising the steps of:
applying the composition to one side or both sides of the substrate, and
curing a layer of the composition thus formed by irradiation with ultraviolet light to form the cured product layer.

6. The composition according to claim 2, wherein r and t=1.

7. A cured product obtained by curing the composition according to claim 1.

8. A release sheet comprising: a substrate, and a cured product layer obtained by curing a layer of the composition according to claim 1 provided on one side or both sides of the substrate.

9. A method of producing a release sheet comprising: a substrate, and a cured product layer obtained by curing a layer of the composition according to claim 1 provided on one side or both sides of the substrate, the method comprising the steps of:
   applying the composition to one side or both sides of the substrate, and
   curing a layer of the composition thus formed by irradiation with ultraviolet light to form the cured product layer.

10. The ultraviolet-curable silicone composition according to claim 1, wherein a cured film obtained by curing the ultraviolet-curable silicone composition has a release force of at least 1.05 N/25 mm and a fluctuation of release force of not greater than 5%.

11. The ultraviolet-curable silicone composition according to claim 1, wherein Ep is an epoxy group selected from the group consisting of

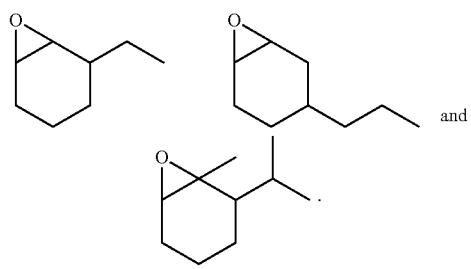

and

12. The ultraviolet-curable silicone composition of claim 1, wherein Ep is an epoxy group of the following formula:

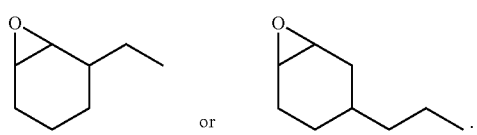

13. An ultraviolet-curable silicone composition comprising:
   (A) 100 parts by mass of an epoxy group-containing organopolysiloxane represented by a formula (1) shown below:

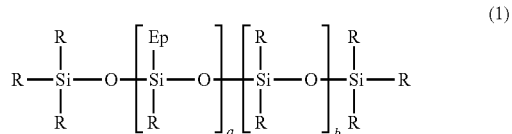

wherein, R represents a methyl group, Ep represents an epoxy group-containing cyclohexyl group, a and b represent integers that satisfy $45 \leq a+b \leq 150$, $1 \leq a$ and $0 \leq b$, $a/(a+b)<0.2$, and an average epoxy equivalence is not more than 700 g/mol, (B) 1 to 15 parts by mass of a terminal epoxy group-containing organopolysiloxane represented by a formula (2) shown below:

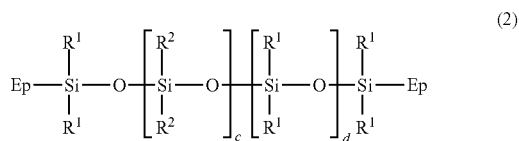

wherein, $R^1$ represents a methyl group, Ep represents an epoxy group-containing cyclohexyl group, $R^2$ represents a phenyl group, and c and d represent positive integers that satisfy $45 \leq c+d \leq 350$ and $0.05 \leq c/(2+c+d) \leq 0.20$, and an onium salt photoinitiator.

14. The composition according to claim 13, further comprising from 1 to 10 parts by mass of a mixture of a component (C) and a component (D) described below, in which a mixing ratio in a mass basis within the mixture satisfies $(C)/(D)=0.1$ to 1.5:
   (C) an organopolysiloxane represented by a formula (3) shown below:

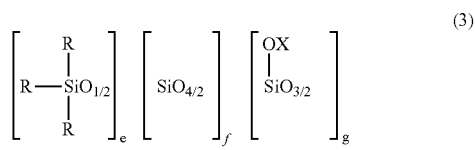

wherein, R represents an unsubstituted or substituted monovalent hydrocarbon group of 1 to 10 carbon atoms, each X represents, independently, a hydrogen atom or a substituent group selected from the group consisting of substituent groups represented by general formulas (i)-(iii) shown below, and e, f and g are positive numbers such that $e/(f+g)$ is within a range from 0.5 to 2.0:

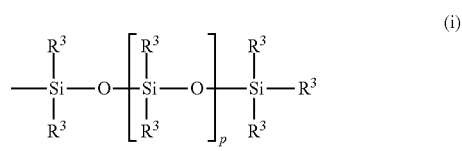

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, and p represents an integer of 0 or greater

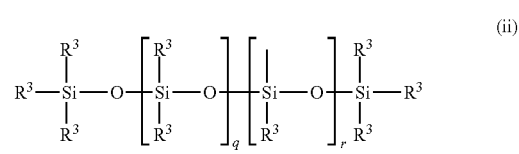

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, q represents an integer of 0 or greater, and r represents an integer of 1 or greater

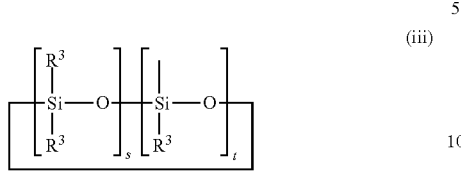

(iii)

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, s represents an integer of 2 or greater, and t represents an integer of 1 or greater, (D) at least one member selected from the group consisting of epoxy group-containing organopolysiloxanes represented by a formula (4) shown below and epoxy group-containing organopolysiloxanes represented by a formula (5) shown below:

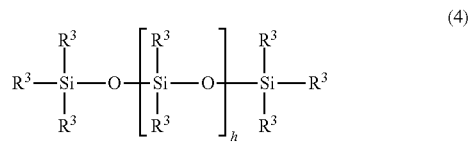

(4)

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and h represents an integer of 3 or greater

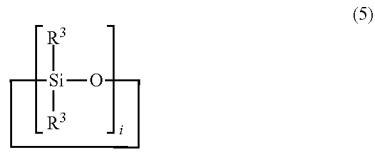

(5)

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and i represents an integer of 3 or greater.

15. A cured product obtained by curing the composition according to claim 14.

16. A release sheet comprising: a substrate, and a cured product layer obtained by curing a layer of the composition according to claim 14 provided on one side or both sides of the substrate.

17. A method of producing a release sheet comprising: a substrate, and a cured product layer obtained by curing a layer of the composition according to claim 14 provided on one side or both sides of the substrate, the method comprising the steps of:

applying the composition to one side or both sides of the substrate, and
curing a layer of the composition thus formed by irradiation with ultraviolet light to form the cured product layer.

18. The composition according to claim 14, wherein r and t=1.

19. A cured product obtained by curing the composition according to claim 13.

20. A release sheet comprising: a substrate, and a cured product layer obtained by curing a layer of the composition according to claim 13 provided on one side or both sides of the substrate.

21. A method of producing a release sheet comprising: a substrate, and a cured product layer obtained by curing a layer of the composition according to claim 13 provided on one side or both sides of the substrate, the method comprising the steps of:

applying the composition to one side or both sides of the substrate, and
curing a layer of the composition thus formed by irradiation with ultraviolet light to form the cured product layer.

22. The ultraviolet-curable silicone composition according to claim 13, wherein a cured film obtained by curing the ultraviolet-curable silicone composition has a release force of at least 1.05 N/25 mm and a fluctuation of release force of not greater than 5%.

23. The ultraviolet-curable silicone composition according to claim 13, wherein Ep is an epoxy group selected from the group consisting of

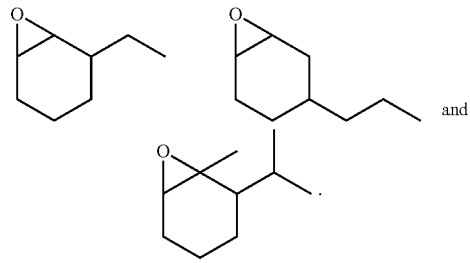

24. The ultraviolet-curable silicone composition of claim 13, wherein Ep is an epoxy group of the following formula:

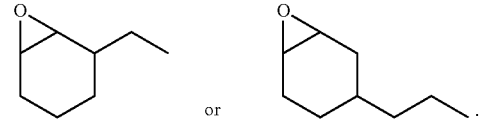

25. An ultraviolet-curable silicone composition comprising:
(A) 100 parts by mass of an epoxy group-containing organopolysiloxane represented by a formula (1) shown below:

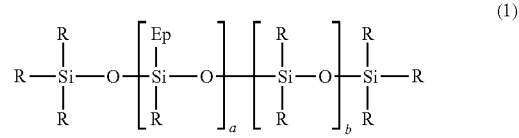

(1)

wherein, R represents a methyl group, Ep represents an epoxy group-containing cyclohexyl group, a and b represent integers that satisfy $45 \leq a+b \leq 150$, $1 \leq a$ and $0 \leq b$, and an average epoxy equivalence is not more than 700 g/mol, (B) 1 to 15 parts by mass of a terminal epoxy group-containing organopolysiloxane represented by a formula (2) shown below:

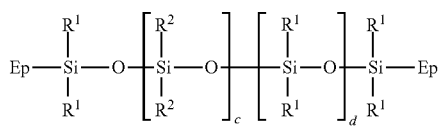

wherein, $R^1$ represents a methyl group, Ep represents an epoxy group-containing substituent group, $R^2$ represents a phenyl group, and c and d represent positive integers that satisfy $45 \leq c+d \leq 350$ and $0.05 \leq c/(2+c+d) \leq 0.20$, and an onium salt photoinitiator, wherein Ep is an epoxy group selected from the group consisting of:

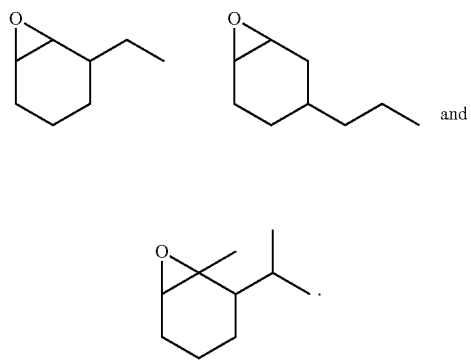

26. The composition according to claim 25, further comprising from 1 to 10 parts by mass of a mixture of a component (C) and a component (D) described below, in which a mixing ratio in a mass basis within the mixture satisfies (C)/(D)=0.1 to 1.5:

(C) an organopolysiloxane represented by a formula (3) shown below:

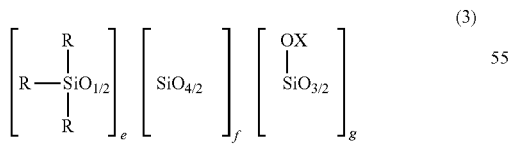

wherein, R represents an unsubstituted or substituted monovalent hydrocarbon group of 1 to 10 carbon atoms, each X represents, independently, a hydrogen atom or a substituent group selected from the group consisting of substituent groups represented by general formulas (i)-(iii) shown below, and e, f and g are positive numbers such that e/(f+g) is within a range from 0.5 to 2.0:

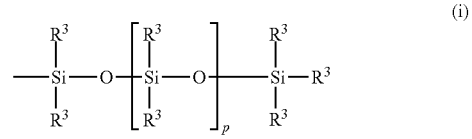

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, and p represents an integer of 0 or greater

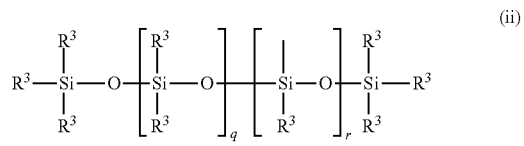

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, q represents an integer of 0 or greater, and r represents an integer of 1 or greater

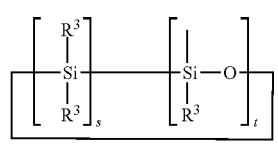

wherein, each $R^3$ represents, independently, an unsubstituted or substituted monovalent hydrocarbon group of 1 to 10 carbon atoms, or an epoxy group-containing substituent group, provided that at least one $R^3$ represents an epoxy group-containing substituent group, s represents an integer of 2 or greater, and t represents an integer of 1 or greater, (D) at least one member selected from the group consisting of epoxy group-containing organopolysiloxanes represented by a formula (4) shown below and epoxy group-containing organopolysiloxanes represented by a formula (5) shown below:

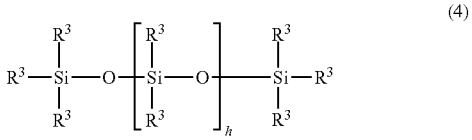

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and h represents an integer of 3 or greater

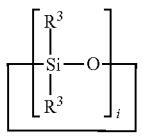
(5)

wherein, each $R^3$ represents, independently, an unsubstituted or substituted monovalent hydrocarbon group of 1 to 10 carbon atoms, or an epoxy group-containing substituent group, provided that at least two of the $R^3$ groups represent epoxy group-containing substituent groups, and i represents an integer of 3 or greater.

27. A cured product obtained by curing the composition according to claim 26.

28. A release sheet comprising: a substrate, and a cured product layer obtained by curing a layer of the composition according to claim 26 provided on one side or both sides of the substrate.

29. A method of producing a release sheet comprising: a substrate, and a cured product layer obtained by curing a layer of the composition according to claim 26 provided on one side or both sides of the substrate, the method comprising the steps of:
   applying the composition to one side or both sides of the substrate, and
   curing a layer of the composition thus formed by irradiation with ultraviolet light to form the cured product layer.

30. The composition according to claim 26, wherein r and t=1.

31. A cured product obtained by curing the composition according to claim 25.

32. A release sheet comprising: a substrate, and a cured product layer obtained by curing a layer of the composition according to claim 25 provided on one side or both sides of the substrate.

33. A method of producing a release sheet comprising: a substrate, and a cured product layer obtained by curing a layer of the composition according to claim 25 provided on one side or both sides of the substrate, the method comprising the steps of:
   applying the composition to one side or both sides of the substrate, and
   curing a layer of the composition thus formed by irradiation with ultraviolet light to form the cured product layer.

34. The ultraviolet-curable silicone composition according to claim 25, wherein a cured film obtained by curing the ultraviolet-curable silicone composition has a release force of at least 1.05 N/25 mm and a fluctuation of release force of not greater than 5%.

35. The ultraviolet-curable silicone composition of claim 25, wherein Ep is an epoxy group of the following formula:

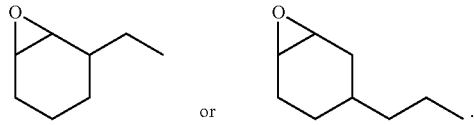

* * * * *